US011593597B2

(12) United States Patent
Hu et al.

(10) Patent No.: US 11,593,597 B2
(45) Date of Patent: Feb. 28, 2023

(54) OBJECT DETECTION IN VEHICLES USING CROSS-MODALITY SENSORS

(71) Applicant: GM GLOBAL TECHNOLOGY OPERATIONS LLC, Detroit, MI (US)

(72) Inventors: Yasen Hu, Warren, MI (US); Shuqing Zeng, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 200 days.

(21) Appl. No.: 17/098,707

(22) Filed: Nov. 16, 2020

(65) Prior Publication Data

US 2022/0156533 A1    May 19, 2022

(51) Int. Cl.
| | |
|---|---|
| G06K 9/62 | (2022.01) |
| G01S 17/89 | (2020.01) |
| G01S 17/931 | (2020.01) |
| G06V 20/56 | (2022.01) |
| G06V 20/64 | (2022.01) |
| G06V 30/24 | (2022.01) |
| G05D 1/02 | (2020.01) |

(52) U.S. Cl.
CPC ............ *G06K 9/6288* (2013.01); *G01S 17/89* (2013.01); *G01S 17/931* (2020.01); *G06V 20/56* (2022.01); *G06V 20/647* (2022.01); *G06V 30/2504* (2022.01); *G05D 1/024* (2013.01); *G05D 1/0246* (2013.01); *G06V 30/2552* (2022.01)

(58) Field of Classification Search
CPC ...... G01S 17/89; G01S 17/931; G01S 7/4802; G01S 7/4808; G05D 1/024; G05D 1/0246; G06K 9/6288; G06V 20/56; G06V 20/647; G06V 30/2504; G06V 30/2552
See application file for complete search history.

(56) References Cited

U.S. PATENT DOCUMENTS

| | | | |
|---|---|---|---|
| 9,916,681 B2* | 3/2018 | James | ........................ G06T 7/60 |
| 10,509,987 B1* | 12/2019 | Kim | ....................... G06V 10/82 |
| 10,528,054 B2 | 1/2020 | Zou | |
| 10,552,695 B1 | 2/2020 | Bush et al. | |

(Continued)

OTHER PUBLICATIONS

Radecki P, Campbell M, Matzen K. All weather perception: Joint data association, tracking, and classification for autonomous ground vehicles. arXiv preprint arXiv:1605.02196. May 7, 2016. (Year: 2016).*

(Continued)

*Primary Examiner* — Michelle M Entezari
*Assistant Examiner* — Michelle M Entezari Hausmann

(57) ABSTRACT

A system includes first and second sensors and a controller. The first sensor is of a first type and is configured to sense objects around a vehicle and to capture first data about the objects in a frame. The second sensor is of a second type and is configured to sense the objects around the vehicle and to capture second data about the objects in the frame. The controller is configured to down-sample the first and second data to generate down-sampled first and second data having a lower resolution than the first and second data. The controller is configured to identify a first set of the objects by processing the down-sampled first and second data having the lower resolution. The controller is configured to identify a second set of the objects by selectively processing the first and second data from the frame.

16 Claims, 4 Drawing Sheets

(56) References Cited

U.S. PATENT DOCUMENTS

| | | | |
|---|---|---|---|
| 10,713,794 B1* | 7/2020 | He | G06V 10/764 |
| 11,023,730 B1* | 6/2021 | Zhou | G06V 10/82 |
| 11,062,454 B1* | 7/2021 | Cohen | G01S 17/89 |
| 11,257,217 B2* | 2/2022 | Shlens | G06N 3/0445 |
| 2017/0236290 A1* | 8/2017 | Sorkine Hornung | G06V 10/426 382/173 |
| 2018/0286117 A1* | 10/2018 | Redden | G06T 7/33 |
| 2019/0286932 A1* | 9/2019 | Du | G06V 20/00 |
| 2020/0064483 A1* | 2/2020 | Li | G01S 7/4026 |
| 2020/0134324 A1 | 4/2020 | Zeng et al. | |
| 2020/0189459 A1 | 6/2020 | Bush et al. | |
| 2020/0226377 A1* | 7/2020 | Campos Macias | G06K 9/6267 |
| 2020/0284912 A1 | 9/2020 | Bush et al. | |
| 2020/0311942 A1 | 10/2020 | Tong et al. | |
| 2020/0318973 A1 | 10/2020 | Bush et al. | |
| 2021/0027098 A1* | 1/2021 | Ge | G06K 9/6256 |
| 2021/0134002 A1* | 5/2021 | Yao | G06T 7/50 |

OTHER PUBLICATIONS

Gao M, Yu R, Li A, Morariu VI, Davis LS. Dynamic zoom-in network for fast object detection in large images. InProceedings of the IEEE conference on computer vision and pattern recognition 2018 (pp. 6926-6935). (Year: 2018).*

Van Etten A. You only look twice: Rapid multi-scale object detection in satellite imagery. arXiv preprint arXiv:1805.09512. May 24, 2018. (Year: 2018).*

Mattela G, Tripathi M, Pal C, Dhiraj RS, Acharyya A. An Efficient Pipeline for Distant Person Detection and Identification in 4K Video using GPUs. In2020 International Conference on COMmunication Systems & NETworkS (COMSNETS) Jan. 7, 2020 (pp. 744-749). IEEE. (Year: 2020).*

U.S. Appl. No. 16/406,164, filed May 8, 2019, Zeng et al.

U.S. Appl. No. 16/515,592, filed Jul. 18, 2019, Bush et al.

* cited by examiner

OBJECT DETECTION IN VEHICLES USING CROSS-MODALITY SENSORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to object detection and more particularly to object detection in vehicles using cross-modality sensors.

Modern vehicles, particularly autonomous and semi-autonomous vehicles, increasingly rely on object detection capabilities. Various sensors such as cameras, radar, Lidar, and so on can be used to detect objects. However, accurate object detection using these sensors is typically computationally intensive. Accuracy of the object detection cannot be sacrificed by using low resolution sensors to reduce computational complexity.

SUMMARY

A system comprises first and second sensors and a controller. The first sensor is of a first type and is configured to sense objects around a vehicle and to capture first data about the objects in a frame. The second sensor is of a second type and is configured to sense the objects around the vehicle and to capture second data about the objects in the frame. The controller is configured to down-sample the first and second data to generate down-sampled first and second data having a lower resolution than the first and second data. The controller is configured to identify a first set of the objects by processing the down-sampled first and second data having the lower resolution. The controller is configured to identify a second set of the objects by selectively processing the first and second data from the frame.

In other features, the controller is configured to detect the first set of the objects based on the processing of the down-sampled second data, to generate proposals regarding identities of the objects based on the processing of the down-sampled first data, and to confirm identities of the detected first set of the objects based on a first set of the proposals.

In other features, the controller is configured to process a second set of the proposals using corresponding data from the first and second data from the frame, and to identify the second set of the objects based on the processing of the second set of the proposals using the corresponding data from the first and second data from the frame.

In another feature, the controller is configured to display the identified first and second sets of the objects on a display in the vehicle.

In another feature, the controller is configured to navigate the vehicle based on the identified first and second sets of the objects.

In other features, the first data is three-dimensional and the second data is two- or three-dimensional.

In other features, the first sensor is a Lidar sensor, and the second sensor is a camera.

In another feature, the proposals include N1 proposals regarding first objects within a first range of the vehicle and N2 proposals regarding second objects within a second range of the vehicle that is beyond the first range, where N1 and N2 are integers greater than 1, and N1>N2.

In other features, the controller is further configured to detect the first set of the objects based on the processing of the down-sampled second data, to confirm identities of the detected first set of the objects based on a first set of the N1 proposals that match the detected first set of the objects, and to identify the second set of the objects by processing a second set of the N1 proposals using the corresponding data from the first and second data from the frame.

In other features, the controller is further configured to detect the first set of the objects based on the processing of the down-sampled second data, to confirm identities of the detected first set of the objects based on a first set of the N2 proposals that match the detected first set of the objects, and to identify the second set of the objects by processing a second set of the N2 proposals using the corresponding data from the first and second data from the frame.

In still other features, a method comprises sensing first data about objects around a vehicle in a frame using a first sensor of a first type, and sensing second data about the objects around the vehicle in the frame using a second sensor of a second type. The method comprises down-sampling the first and second data to generate down-sampled first and second data having a lower resolution than the first and second data, identifying a first set of the objects by processing the down-sampled first and second data having the lower resolution, and identifying a second set of the objects by selectively processing the first and second data from the frame.

In other features, the method further comprises detecting the first set of the objects based on the processing of the down-sampled second data, generating proposals regarding identities of the objects based on the processing of the down-sampled first data, and confirming identities of the detected first set of the objects based on a first set of the proposals.

In other features, the method further comprises processing a second set of the proposals using corresponding data from the first and second data from the frame, and identifying the second set of the objects based on the processing of the second set of the proposals using the corresponding data from the first and second data from the frame.

In another feature, the method further comprises displaying the identified first and second sets of the objects on a display in the vehicle.

In another feature, the method further comprises navigating the vehicle based on the identified first and second sets of the objects.

In other features, the first data is three-dimensional, and the second data is two- or three-dimensional.

In other features, the first sensor is a Lidar sensor, and the second sensor is a camera.

In another feature, the proposals include N1 proposals regarding first objects within a first range of the vehicle and N2 proposals regarding second objects within a second range of the vehicle that is beyond the first range, where N1 and N2 are integers greater than 1, and N1>N2.

In other features, the method further comprises detecting the first set of the objects based on the processing of the down-sampled second data, confirming identities of the detected first set of the objects based on a first set of the N1 proposals that match the detected first set of the objects, and identifying the second set of the objects by processing a second set of the N1 proposals using the corresponding data from the first and second data from the frame.

In other features, the method further comprises detecting the first set of the objects based on the processing of the down-sampled second data, confirming identities of the detected first set of the objects based on a first set of the N2 proposals that match the detected first set of the objects, and identifying the second set of the objects by processing a second set of the N2 proposals using the corresponding data from the first and second data from the frame.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to detecting objects using cross-modality sensors. For example, objects can be detected using a combination of Lidar sensors and cameras although any other types of sensors may be used instead. The object detection using cross-modality sensors can be performed in two phases. In a first phase called a glance phase, data about objects around a vehicle is captured in a frame by a first sensor (e.g., a Lidar sensor) and a second sensor (e.g., a camera). The captured by each sensor is down-sampled and processed rapidly in parallel at a lower resolution. Object are detected from the down-sampled camera data, and proposals regarding detected objects are generated from the down-sampled Lidar data. The detected objects from the down-sampled camera data and the proposals generated from the down-sampled Lidar data are combined. Objects that can be identified with certainty (i.e., verified) by both sensors from the combination of the detected objects and the proposals are confirmed as being correctly identified.

In a second phase called the focus phase, proposals from the combination that can be verified by one sensor but not the other sensor (i.e., unconfirmed proposals) are processed at a higher resolution than in the first phase using only corresponding data in the frame from both sensors. The data from the second sensor (e.g., camera) only for the unconfirmed proposals is processed at a higher resolution than in the first phase to detect objects in the unconfirmed proposals. Further, data from the first sensor (e.g., Lidar) only for the unconfirmed proposals is processed at a higher resolution than in the first phase and is used to confirm identities of the detected objects in the unconfirmed proposals.

Figure 1:
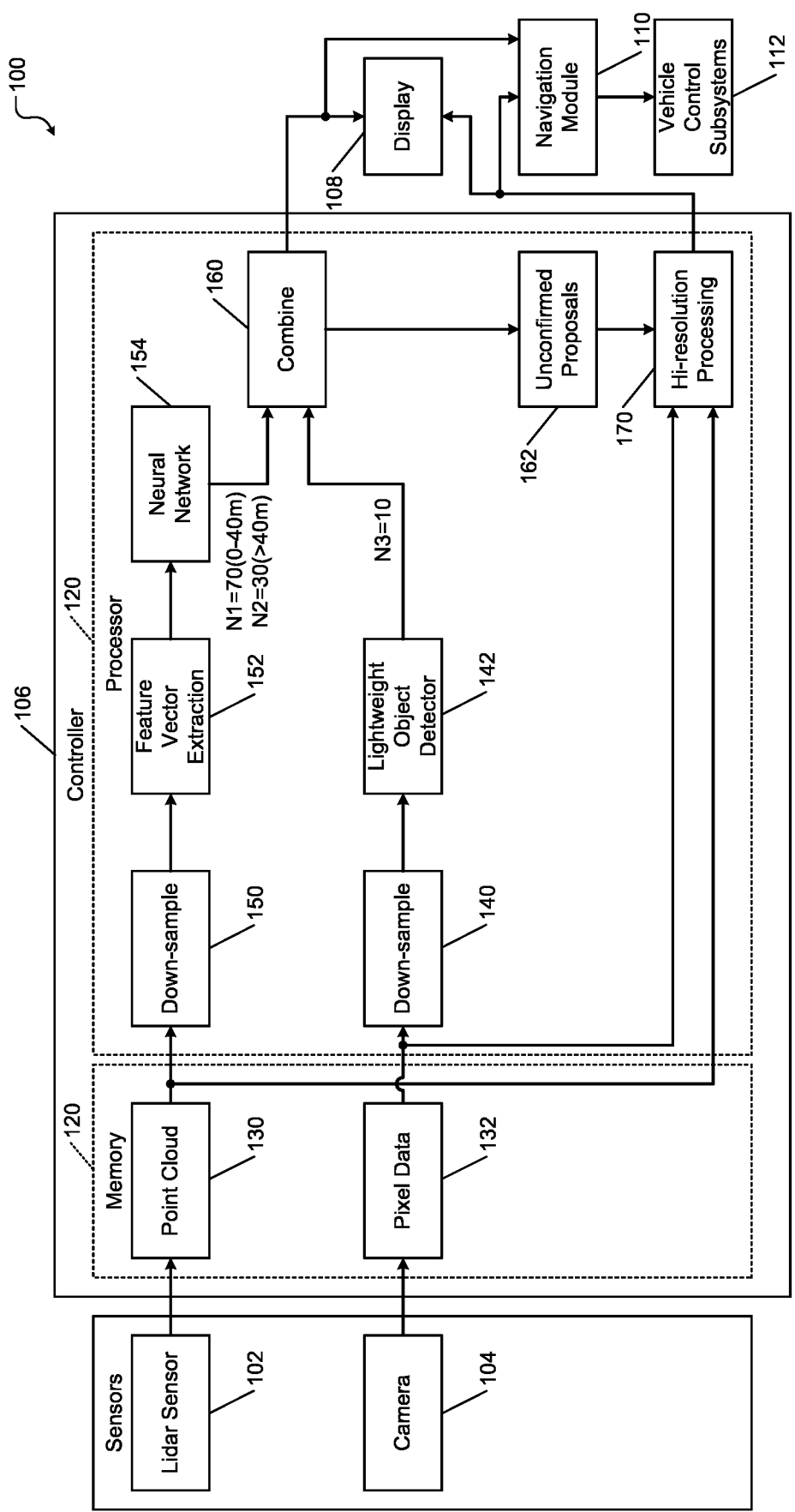
FIG. 1 is a functional block diagram of a system for detecting objects around a vehicle using two different types of sensors according to the present disclosure.

The above two-phase processing system of the present disclosure has many advantages over prior art. Typically, limited computational resources are available to process data from high resolution sensors such as cameras, Lidar, etc. If low resolution data is used due to the computational capacity constraints, at lower resolution, these sensors perform poorly in detecting distant objects or small objects. If high/original resolution data is used, most systems cannot process all of the data in real-time due to limited computational resources. In contrast, the two-phase processing system of the present disclosure can be implemented with limited computational resources without sacrificing accuracy and reliability of detecting objects regardless of their distance and size from the vehicle. Specifically, in the two-phase processing system, since the processing in the first phase is performed at a lower resolution, the processing in the first phase is not computationally intensive. As a result, the processing in the first phase can be performed rapidly and at relatively lower power consumption. In the second phase, only a very limited amount of raw data corresponding to the unconfirmed proposals is processed at its original resolution, which is higher than most of the down-sampled data processed at the lower resolution in the first phase. Accordingly, very limited amount of high resolution and power intensive processing is performed as needed. These and other features of the two-phase processing system of the present disclosure are described below in detail FIG. 1 shows a block diagram of a system 100 for detecting objects around a vehicle using two different types of sensors according to the present disclosure. For example only, throughout the present disclosure, a first type of sensor is a Lidar sensor, and a second type of sensor is a camera. Alternatively, any other types of sensors of different modalities may be used instead.

Camera data, whether captured by 2D or 3D camera, has limitations on estimating far away objects (e.g., 2D camera data lacks depth information, and 2D/3D camera data has very few pixels for far away objects) but captures color and texture information from the objects. Lidar data lacks color and texture information but provides depth information about the objects that the camera data lacks. Thus, the two types of sensors together provide data that can be combined to accurately identify objects that are relatively near and far from the vehicle as explained below in detail.

The system 100 comprises a first sensor 102 of a first type (e.g., a Lidar sensor), a second sensor 104 of a second type (e.g., a camera), a controller 106 to process the data from the first and second sensors 102, 104 and to detect objects around the vehicle, a display 108 (e.g., located in a dashboard of the vehicle) to display the detected objects, a navigation module 110 (e.g., of an autonomous or semi-autonomous vehicle) to navigate the vehicle based on the detected objects, and one or more vehicle control subsystems 112 (e.g., braking subsystem, cruise control subsystem, etc.) that are controlled by the navigation module 110 based on the detected objects. The controller 106 comprises a memory 120 and a processor 122. The controller 106 processes data from the two sensors 102, 104 in parallel as described below.

The first sensor 102 (e.g., a Lidar sensor) generates 3D point cloud data 130 about objects sensed around the vehicle in a frame. The second sensor 104 (e.g., a camera) generates 2D pixel data 132 about the objects sensed around the vehicle in the frame. The memory 120 stores the point cloud data 130 and the pixel data 132. In addition, the memory 120 stores instructions executed by the processor 122 to process the data from the first and second sensors 102, 104 as follows.

The processor 122 down-samples the pixel data 132 and generates a down-sampled pixel data 140 having a lower resolution than the resolution of the raw, higher resolution pixel data 132 captured by the camera 104. The processor 122 comprises a lightweight object detector 142 that detects objects by processing the down-sampled pixel data 140. The object detector 142 is lightweight; that is, computationally not intensive, since the object detector 142 processes the down-sampled pixel data 140 at a lower resolution and does not process the raw, higher resolution pixel data 132 captured by the camera 104. For example, the object detector 142 may detect some of the objects surrounding the vehicle, shown as N3 in FIG. 1.

The processor 122 also down-samples the point cloud data 130 and generates a down-sampled point cloud data 150 having a lower resolution than the resolution of the raw, higher resolution point cloud data 130 captured by the Lidar sensor 102. The processor 122 extracts feature vectors 152 from the down-sampled point cloud data 150. The processor 122 comprises a trained neural network 154 that generates proposals for the objects surrounding the vehicle based on the feature vectors 152 extracted from the down-sampled point cloud data 150.

The proposals may include N1 proposals for short-range objects (i.e., objects located within a relatively short range from the vehicle (e.g., 0-40 m)) and N2 proposals for long-range objects (i.e., objects located within a relatively long range (i.e., beyond the short-range) from the vehicle (e.g., >40 m)). Accordingly, the N1 proposals may be called short range proposals, and the N2 proposals may be called long range proposals. For example, N1>N2. Again, the neural network 154 is lightweight; that is, computationally not intensive, since the feature vectors 152 used by the neural network 154 are extracted from the down-sampled point cloud data 150 at a lower resolution and not from the raw, higher resolution point cloud data 130 captured by the Lidar sensor 102.

The processor 122 projects the 3D proposals onto the 2D objects detected by the object detector 142. The processor 122 processes a combination 160 of the projected N1 and N2 proposals generated based on the down-sampled point cloud data 150 and the N3 objects detected based on the down-sampled pixel data as described below with reference to FIGS. 2 and 3.

Figure 2:
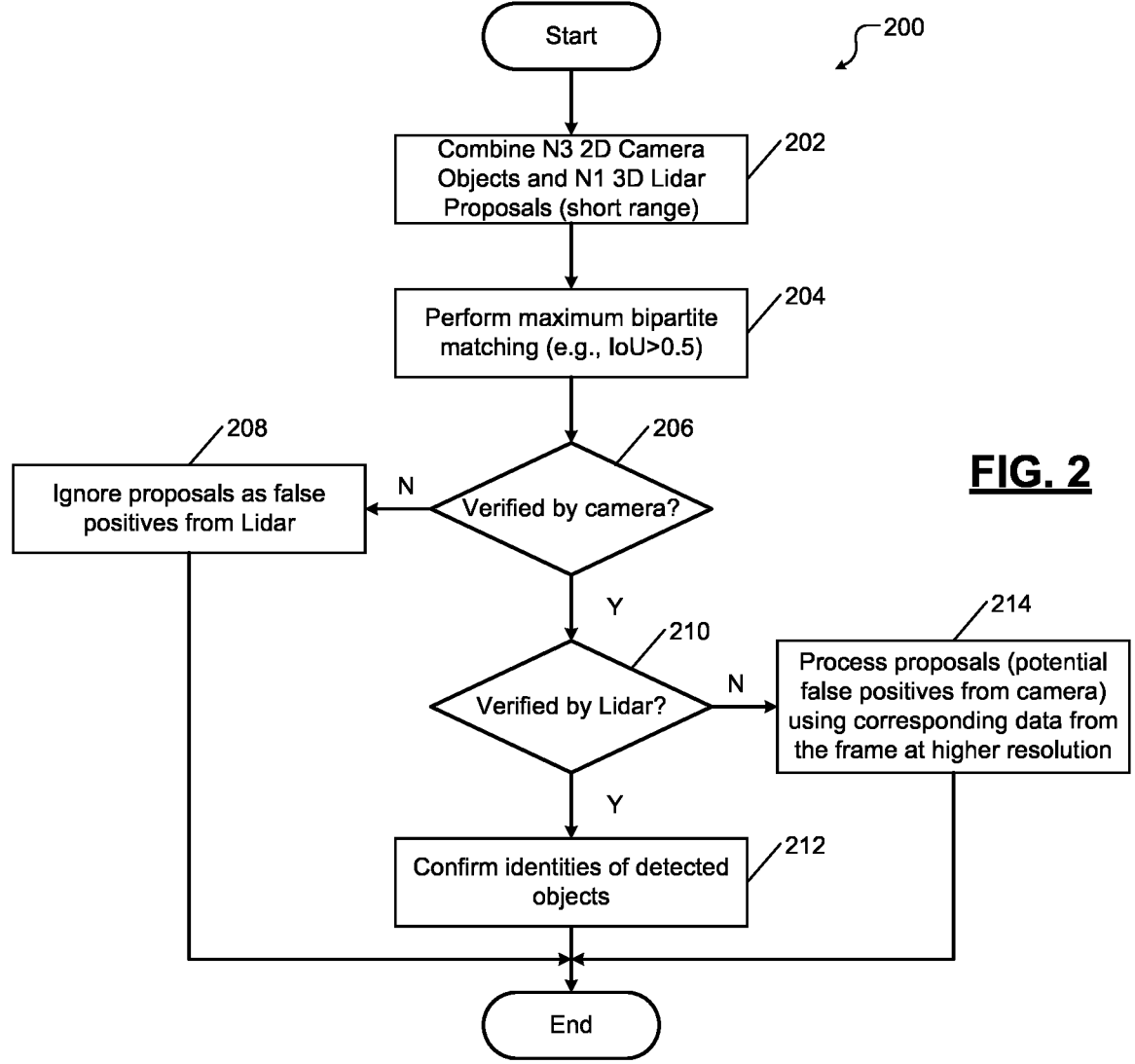
FIGS. 2 and 3 show flowcharts of methods for detecting short range and long range objects around a vehicle using the system of FIG. 1.

FIG. 2 shows a method 200 for processing the combination 160 of the projected N1 proposals (i.e., the short range proposals) generated based on the down-sampled point cloud data 150 and the N3 objects detected based on the down-sampled pixel data 140. Throughout the description of FIGS. 2-5 below, the term control refers to the controller 106 generally and the processor 122 particularly.

At 202, control combines the projected N1 proposals (i.e., the short range proposals) generated based on the down-sampled point cloud data 150 and the N3 objects detected based on the down-sampled pixel data 140. At 204, control performs maximum bipartite matching between the projected N1 proposals and the N3 objects based on Intersection over Union (IoU) ratios of bounding boxes. An IoU is a ratio of an area of overlap (i.e., intersection) between two bounding boxes to an area of union of the two bounding boxes. The projected N1 proposals with IoU>0.5 are selected as valid candidates, and the maximum bipartite matching is used to find the best matching pairs between the selected N1 proposals and the detected N3 objects.

At 206, from the N1 proposals that match with the detected N3 objects, control determines if these matching proposals can be verified by the camera data. At 208, control disregards or ignores those of the matching proposals that cannot be verified by the camera data, as false positives detected by the Lidar sensor 102. Not processing false positives detected by the Lidar sensor 102 also results in computational savings.

For those of the matching proposals that are verified by the camera data, at 210, control determines if these matching proposals can also be verified by the Lidar data. If these matching proposals are also verified by the Lidar data, at 212, control confirms the identities of the objects detected by the camera 104.

For those of the matching proposals that are verified by the camera data but not by the Lidar data, at 214, control processes these matching proposals, which represent potential false positives from the camera, and which are shown in FIG. 1 as unconfirmed proposals 162, at a higher resolution. Control processes these unconfirmed proposals 162 using corresponding higher resolution, raw pixel data 132 from the camera 104 and using corresponding higher resolution, raw point cloud data 130 from the Lidar sensor 102. The high resolution processing, which is shown in FIG. 1 at 170, is described below with reference to FIG. 5.

Figure 3:
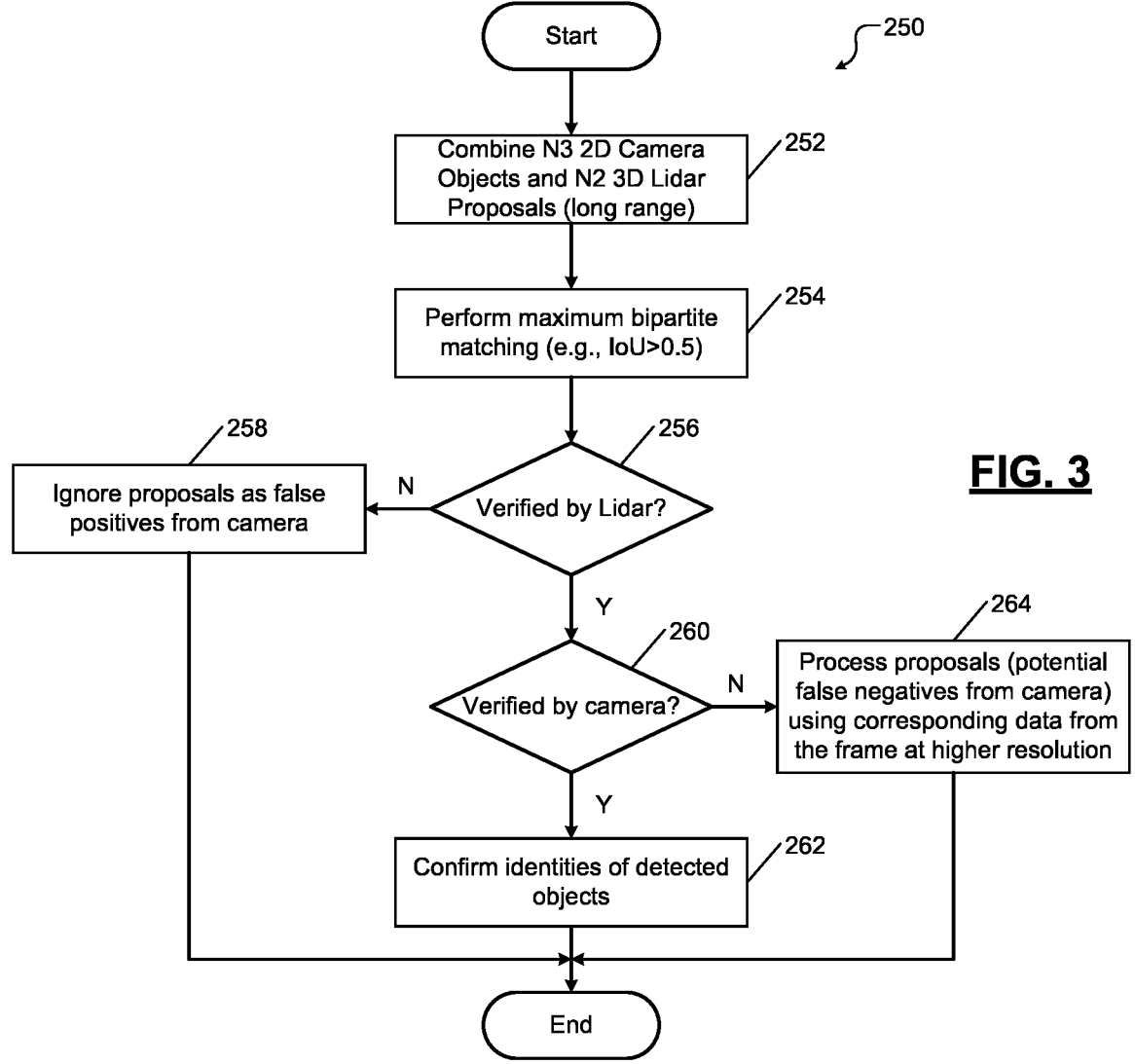

FIG. 3 shows a method 250 for processing the combination 160 of the projected N2 proposals (i.e., the long range proposals) generated based on the down-sampled point cloud data 150 and the N3 objects detected based on the down-sampled pixel data 140. The methods 200 and 250 are shown separately only for illustrative purposes; control performs the methods 200 and 250 in parallel.

At 252, control combines the projected N2 proposals generated based on the down-sampled point cloud data 150 and the N3 objects detected based on the down-sampled pixel data 140. At 254, control performs maximum bipartite matching between the projected N2 proposals and the N3 objects based on IoU ratios of bounding boxes. The projected N2 proposals with IoU>0.5 are selected as valid candidates, and the maximum bipartite matching is used to find the best matching pairs between the selected N2 proposals and the detected N3 objects.

At 256, from the N2 proposals that match with the detected N3 objects, control determines if these matching proposals can be verified by the Lidar data. At 258, control disregards or ignores those of the matching proposals that cannot be verified by the Lidar data, as false positives detected by the camera 104. Not processing false positives detected by the camera 104 also results in computational savings.

For those of the matching proposals that are verified by the Lidar data, at 260, control determines if these matching proposals can also be verified by the camera data. If these matching proposals are also verified by the camera data, at 262, control confirms the identities of the objects detected by the camera 104.

For those of the matching proposals that are verified by the Lidar data but not by the camera data, at 264, control processes these matching proposals, which represent potential false negatives from the camera, and which are shown in FIG. 1 as unconfirmed proposals 162, at a higher resolution. Control processes these unconfirmed proposals 162 using corresponding higher resolution, raw pixel data 132 from the camera 104 and using corresponding higher resolution, raw point cloud data 130 from the Lidar sensor 102. The high resolution processing, which is shown in FIG. 1 at 170, is described below with reference to FIG. 5.

Figure 4:
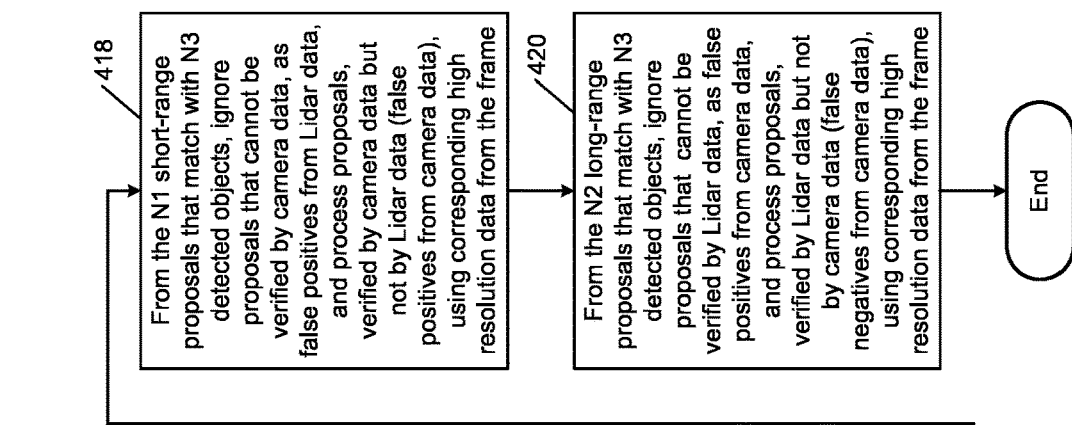
FIG. 4 shows a flowchart of a method that combines the methods of FIGS. 2 and 3 for detecting objects around a vehicle using the system of FIG. 1.
Figure 4:
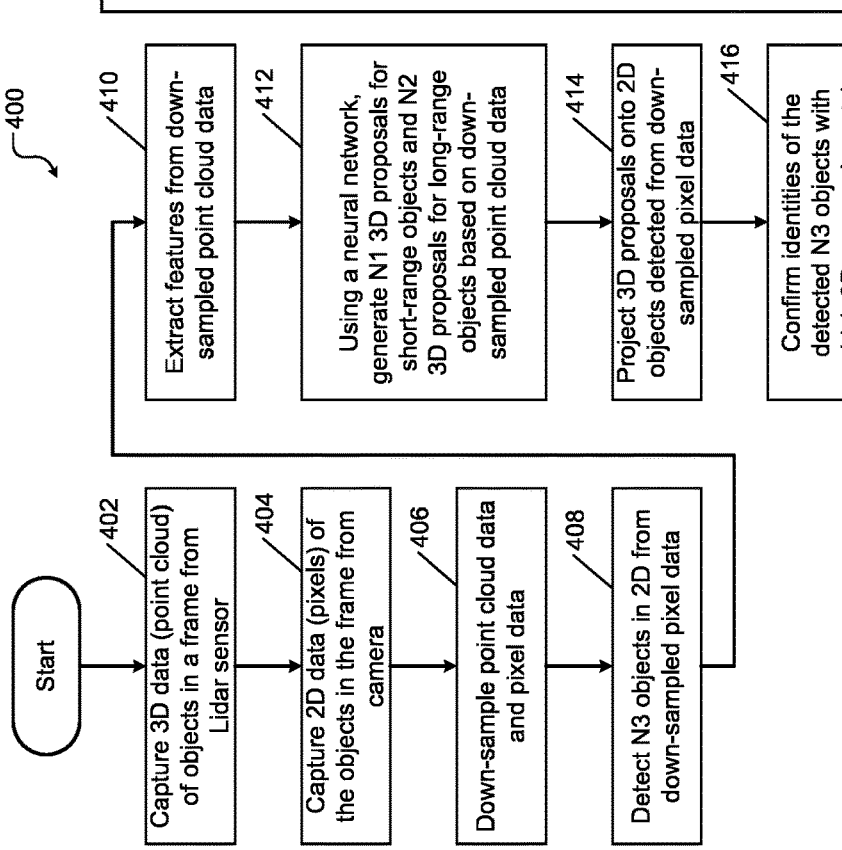

FIG. 4 shows a combined method 300 (i.e., a combination of the methods 200 and 250) for processing data from two different types of sensors shown in FIG. 1, primarily at a lower resolution, and secondarily, partially at a higher resolution if needed, and detecting objects around the vehicle.

At 402, control captures 3D point cloud data of objects in a frame from a Lidar sensor. At 404, control captures 2D pixel data of the objects in the frame from a camera. At 406, control down-samples the point cloud data and the pixel data. At 408, control detects N3 objects in 2D from the down-sampled pixel data.

At 410, control extracts features from the down-sampled point cloud data. At 412, control inputs the extracted features to a trained neural network and generates N1 3D proposals for short-range objects and N2 3D proposals for long-range objects based on the down-sampled point cloud data.

At 414, control projects the 3D proposals onto the 2D objects detected from the down-sampled pixel data. At 416, control confirms identities of the detected N3 objects with which the projected 3D proposals match and when the matching of the projected proposals and the detected objects is verified by both camera data and Lidar data.

At 418, from the N1 short range proposals that match with the N3 detected objects, control ignores those proposals that cannot be verified by camera data as false positives from Lidar data. Additionally, control processes those proposals from the N1 short range proposals that match with the N3 detected objects and that can be verified by camera data but not by Lidar data (false positives from camera data) using corresponding high-resolution data from the frame. The high resolution processing is described below with reference to FIG. 5.

At 420, from the N2 long range proposals that match with the N3 detected objects, control ignores those proposals that cannot be verified by Lidar data as false positives from camera data. Additionally, control processes those proposals from the N2 long range proposals that match with the N3 detected objects and that can be verified by Lidar data but not by camera data (false negatives from camera data) using corresponding high-resolution data from the frame. The high resolution processing is described below with reference to FIG. 5.

Figure 5:
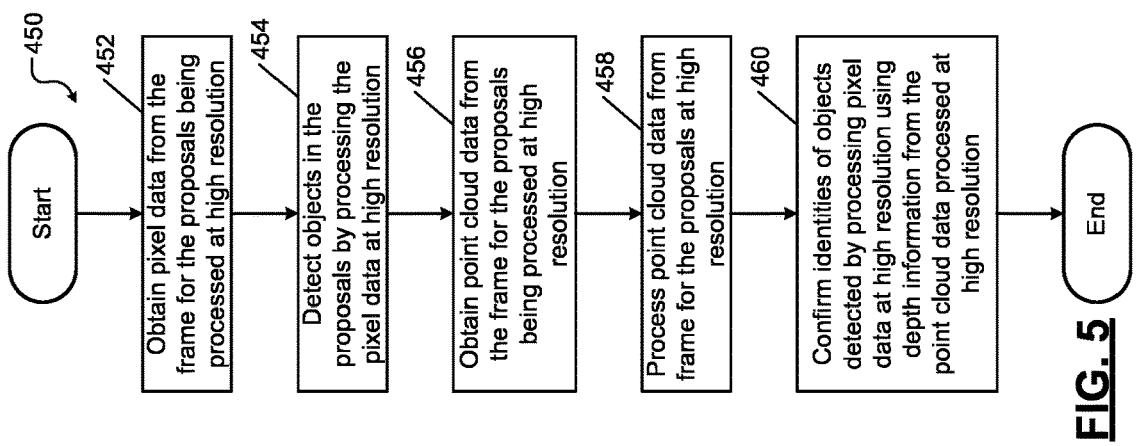
FIG. 5 shows a flowchart of a method for performing high resolution processing of portions of data from the two sensors in the methods of FIG. 2-4 for detecting objects around a vehicle using the system of FIG. 1.

FIG. 5 shows a method 450 for processing the proposals that match with the objects detected by the camera, that are verified by one of the two sensors, but that are not verified the other of the two sensors. Such proposals are shown in FIG. 1 as unconfirmed proposals 162, and their processing at a higher resolution is shown in FIG. 1 at 170, which is described below.

At 452, control obtains the partial pixel data from the frame only for the proposals being processed at high resolution. The partial pixel data obtained from the frame is the raw, high-resolution original data captured by the camera 104. At 454, control detects objects in these proposals by processing the partial pixel data at high resolution.

At 456, control obtains the partial point cloud data from the frame only for the proposals being processed at high resolution. The partial point cloud data obtained from the frame is the raw, high-resolution original data captured by the Lidar sensor 102. At 458, control processes the partial point cloud data for the proposals at high resolution.

At 460, control confirms the identities of the objects detected at 454 using the processing performed at 458. For example, control confirms the identities of the objects detected by processing the partial pixel data at high resolution using depth information obtained from the partial point cloud data processed at high resolution. This partial or residual object detection (main or most of the object detection is performed at low resolution at 418 in FIG. 4) is the only computationally intensive object detection performed by the system 100 shown in FIG. 1. This partial high-resolution object detection is performed only when all of the objects are not identified using the low-resolution object detection performed using the down-sampled data from the two sensors at 418 in FIG. 4.

In FIG. 1, the objects detected at 418 in FIG. 4 and at 460 in FIG. 5 are displayed on the display 108 (e.g., of an infotainment module in the vehicle). These detected objects are also input to the navigation module 110. The navigation module 110 can control the one or more vehicle control subsystems 112 based on the detected objects.

Accordingly, the system and methods of the present disclosure significantly improve the technical field of object detection generally and particularly in autonomous and semi-autonomous vehicles. Specifically, the system and methods significantly improve the speed with which objects can be detected using significantly reduced and simplified processing resources (due to the low resolution processing of data from sensors of different modalities as explained above) without sacrificing accuracy, which can be crucial in autonomous and semi-autonomous vehicles.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
    a first sensor of a first type configured to sense objects around a vehicle and to capture first data about the objects in a frame;
    a second sensor of a second type configured to sense the objects around the vehicle and to capture second data about the objects in the frame; and
    a controller configured to:
        down-sample the first and second data to generate down-sampled first and second data having a lower resolution than the first and second data;
        identify a first set of the objects by processing the down-sampled first and second data having the lower resolution;
        detect the first set of the objects based on the processing of the down-sampled second data;
        generate proposals regarding identities of the objects based on the processing of only the down-sampled first data;
        confirm identities of the detected first set of the objects based on a first set of the proposals;
        identify a second set of the objects by selectively processing the first and second data from the frame
        process a second set of the proposals using corresponding data from the first and second data from the frame; and
        identify the second set of the objects based on the processing of the second set of the proposals using the corresponding data from the first and second data from the frame.

2. The system of claim 1 wherein the controller is configured to display the identified first and second sets of the objects on a display in the vehicle.

3. The system of claim 1 wherein the controller is configured to navigate the vehicle based on the identified first and second sets of the objects.

4. The system of claim 1 wherein the first data is three-dimensional and the second data is two- or three-dimensional.

5. The system of claim 1 wherein the first sensor is a Lidar sensor and the second sensor is a camera.

6. The system of claim 1 wherein the proposals include N1 proposals regarding first objects within a first range of the vehicle and N2 proposals regarding second objects within a second range of the vehicle that is beyond the first range, where N1 and N2 are integers greater than 1, and N1>N2.

7. The system of claim 6 wherein the controller is further configured to:
confirm the identities of the detected first set of the objects based on a first set of the N1 proposals that match the detected first set of the objects; and
identify the second set of the objects by processing a second set of the N1 proposals using the corresponding data from the first and second data from the frame.

8. The system of claim 6 wherein the controller is further configured to:
confirm the identities of the detected first set of the objects based on a first set of the N2 proposals that match the detected first set of the objects; and
identify the second set of the objects by processing a second set of the N2 proposals using the corresponding data from the first and second data from the frame.

9. A method comprising:
sensing first data about objects around a vehicle in a frame using a first sensor of a first type;
sensing second data about the objects around the vehicle in the frame using a second sensor of a second type;
down-sampling the first and second data to generate down-sampled first and second data having a lower resolution than the first and second data;
identifying a first set of the objects by processing the down-sampled first and second data having the lower resolution;
detecting the first set of the objects based on the processing of the down-sampled second data;
generating proposals regarding identities of the objects based on the processing of only the down-sampled first data;
confirming identities of the detected first set of the objects based on a first set of the proposals;
identifying a second set of the objects by selectively processing the first and second data from the frame;
processing a second set of the proposals using corresponding data from the first and second data from the frame; and
identifying the second set of the objects based on the processing of the second set of the proposals using the corresponding data from the first and second data from the frame.

10. The method of claim 9 further comprising displaying the identified first and second sets of the objects on a display in the vehicle.

11. The method of claim 9 further comprising navigating the vehicle based on the identified first and second sets of the objects.

12. The method of claim 9 wherein the first data is three-dimensional and the second data is two- or three-dimensional.

13. The method of claim 9 wherein the first sensor is a Lidar sensor and the second sensor is a camera.

14. The method of claim 9 wherein the proposals include N1 proposals regarding first objects within a first range of the vehicle and N2 proposals regarding second objects within a second range of the vehicle that is beyond the first range, where N1 and N2 are integers greater than 1, and N1>N2.

15. The method of claim 14 further comprising:
confirming the identities of the detected first set of the objects based on a first set of the N1 proposals that match the detected first set of the objects; and
identifying the second set of the objects by processing a second set of the N1 proposals using the corresponding data from the first and second data from the frame.

16. The method of claim 14 further comprising:
confirming the identities of the detected first set of the objects based on a first set of the N2 proposals that match the detected first set of the objects; and
identifying the second set of the objects by processing a second set of the N2 proposals using the corresponding data from the first and second data from the frame.

* * * * *